US010217373B2

(12) United States Patent
Ferreras

(10) Patent No.: US 10,217,373 B2
(45) Date of Patent: Feb. 26, 2019

(54) LEARNING SYSTEM AND METHOD

(71) Applicant: Julian Ferreras, Barrow, AK (US)

(72) Inventor: Julian Ferreras, Barrow, AK (US)

( * ) Notice: Subject to any disclaimer, the term of this patent is extended or adjusted under 35 U.S.C. 154(b) by 0 days.

(21) Appl. No.: 15/347,671

(22) Filed: Nov. 9, 2016

(65) Prior Publication Data
US 2018/0068586 A1    Mar. 8, 2018

Related U.S. Application Data

(60) Provisional application No. 62/383,065, filed on Sep. 2, 2016.

(51) Int. Cl.
*A63F 1/00* (2006.01)
*G09B 1/34* (2006.01)

(52) U.S. Cl.
CPC ....................... *G09B 1/34* (2013.01)

(58) Field of Classification Search
CPC ....................................................... A63F 1/00
USPC ....................................................... 273/292
See application file for complete search history.

(56) References Cited

U.S. PATENT DOCUMENTS

| 143,703 | A | | 10/1873 | Louineau | |
|---|---|---|---|---|---|
| 243,855 | A | | 7/1881 | Crandall | |
| 253,895 | A | | 2/1882 | Sheldon | |
| 278,646 | A | | 5/1883 | Williams | |
| 303,816 | A | * | 8/1884 | Crosby | A63F 1/02 273/293 |
| 533,216 | A | | 1/1895 | Troelltsch | |
| 599,767 | A | | 3/1898 | Clarke | |
| 741,984 | A | | 10/1903 | Tavenner | |
| 793,455 | A | | 6/1905 | Mandelbaum | |
| 956,827 | A | | 5/1910 | Rieth | |
| 1,057,206 | A | | 3/1913 | Zuydhoek | |
| 2,198,670 | A | * | 4/1940 | Johnson | G09B 19/02 273/299 |
| 2,253,823 | A | * | 8/1941 | Suteras | A63F 9/20 273/289 |
| D142,491 | S | * | 10/1945 | Neiser | 273/292 |
| 3,680,866 | A | * | 8/1972 | Kerr | A63F 9/20 273/293 |
| 3,773,327 | A | | 11/1973 | Kremer | |
| 4,125,263 | A | * | 11/1978 | Hamilton | A63F 9/20 273/293 |
| 4,359,227 | A | * | 11/1982 | Porciello | A63F 3/00 273/268 |
| 5,108,291 | A | | 4/1992 | Kuo | |
| D338,243 | S | * | 8/1993 | Underwood | D21/391 |

(Continued)

*Primary Examiner* — John E Simms, Jr.
*Assistant Examiner* — Dolores Collins
(74) *Attorney, Agent, or Firm* — Seed IP Law Group LLP

(57) ABSTRACT

A method of playing a learning game having game pieces with a playing face divided into first and second sections, the first section displaying a first number and the second section displaying the first number, a mathematical operation, and a second number, the method including taking turns to place a game piece on a playing surface adjacent a game piece already on the playing surface in which a numeric value of the first number in the first section of the game piece or the numeric value of the result of the mathematical operation in the second section is equal to a numeric value of a first or second section of the game piece already on the playing surface that is not adjacent another game piece.

3 Claims, 2 Drawing Sheets

(56) References Cited

U.S. PATENT DOCUMENTS

| | | | | |
|---|---|---|---|---|
| 6,062,566 | A * | 5/2000 | Lemons | A63F 9/20 273/292 |
| 6,209,875 | B1 * | 4/2001 | Vildosola | A63F 9/20 273/302 |
| 6,971,649 | B2 * | 12/2005 | Richardson | A63F 9/20 273/293 |
| 7,380,792 | B2 * | 6/2008 | Taranino | A63F 9/20 273/146 |
| 7,857,315 | B2 * | 12/2010 | Hoyt | A63F 3/0415 273/293 |
| D662,149 | S | 6/2012 | Nathanson | |
| 8,596,642 | B2 * | 12/2013 | Watkins | A63F 3/00157 273/274 |
| 2010/0148443 | A1 * | 6/2010 | Hoyt | A63F 3/0415 273/293 |
| 2012/0244922 | A1 * | 9/2012 | Horovitz | A63F 3/0423 463/11 |

* cited by examiner

LEARNING SYSTEM AND METHOD

BACKGROUND

Technical Field

The present disclosure pertains to educational game systems and, more particularly, to a dominoes style game and method of play for learning basic math operations.

Description of the Related Art

The game of dominoes has been played in many variations throughout the centuries. It is believed that dominoes originated from dice and were developed by the Chinese at some time in the $12^{th}$ century. The game has evolved over the years to now include 28 rectangular blocks having a playing face divided into two equal-sized squares. Dots or "pips" representing numbers are formed in each square. A single dot represents the number one and two dots represent the number two. Up to six dots can appear in a single square. Some squares can be left blank. A domino block having two blank squares or having the same number in both squares is known as a double.

According to one set of rules, at the commencement of the game, the dominoes are mixed with their faces downwards. Each person draws seven pieces at random. Various mechanisms can be employed to determine which player places the first piece on the playing surface. The next player must match the number at either end of the piece he may choose, according to the number of dots or the blank in the chosen square of the domino. The second block is thus placed with the matching number up against the first played number. Whenever any player cannot match a played domino, either the domino last put down, or of that unpaired domino at the other end of the row, then she must draw a block from the mixed blocks and the next person plays. Thus they play alternately, either until one player has played all his or her pieces, and thereby won the game, or until the game is blocked; that is, when neither party can play by matching the pieces when unpaired at either end. The winner is the player who possesses the lowest number of dots on the pieces remaining. In playing this game it is to the advantage of the player to dispossess, as early as possible, the higher number pieces, such as a double-six, five, four, etc. Sometimes when two persons play, they take each only seven pieces, and agree to play or draw, that is when one cannot come in or pair the pieces on the board at the end unmatched, he then is to draw from the fourteen pieces in stock until he find one to suit.

Over the years, various inventors have patented alterations to the domino blocks or to the method of play or both.

For example, in 1873 a patent issued to Louineau (U.S. Pat. No. 143,703) described a modification to the traditional dominoes game wherein different number sets of points or dots are of different colors. In 1881 Crandall obtained U.S. Pat. No. 243,855 for dominoes with partial animal shapes thereon. And in 1882, Sheldon (U.S. Pat. No. 253,895) designed a combination playing card and dominoes. The following year Williams (U.S. Pat. No. 278,646) used dominoes that employ different colors for different number sets of dots. Twelve years later, Troelltsch's U.S. Pat. No. 533,216, issued in 1898, for a picture game for illustrating first reckoning. The pictures include black dots, colored circles, hearts, and a phase of the moon, among others. Mathematical operations are also disclosed. And just before the turn of the century, Clarke obtained U.S. Pat. No. 599,767 that described game pieces that can be used in games analogous to dominoes.

In the $20^{th}$ century, a number of additional patents followed:

Tavenner (U.S. Pat. No. 741,984) illustrates a picture game that includes dots and other symbols that are suitable for instructing children in the rudiments of arithmetic. Mandelbaum (U.S. Pat. No. 793,455) provides domino game pieces that include sets of dots and suits of cards. Rieth (U.S. Pat. No. 956,827) proposed a combination of game blocks that can be used to play games of cards and dominoes. Each block shows a card suit and a card value. Zuydhoek (U.S. Pat. No. 1,057,206) uses dominoes or playing cards in which numbers and colors can be used.

Kremer (U.S. Pat. No. 3,773,327) describes an apparatus for playing a game, in which domino-like members are arranged in abutted relationship by matching a visible symbol on one member with a visible symbol on another member, consisting of a set of domino-like members each having two parts, each part bearing a visible symbol and mating elements individual to the symbol borne by the part whereby during the game the correctness of matching is checked by whether the mating elements of the two matched parts will cooperate. One part has mating elements on three sides.

Kuo (U.S. Pat. No. 5,108,291) uses a number of rectangular blocks of a prescribed shape that occupy a predetermined area when assembled together, and a corresponding area of triangular shaped blocks of various sizes and shapes. In addition to creating artistic designs by different arrangements of the blocks, which may be of different colors, the rectangular blocks can be used in the fashion of a domino game, and the dimensional relationship between the triangular blocks and the rectangular blocks teaches the basic concepts of mathematics, including addition, subtraction, multiplication, fractions, areas, and the like.

Lemons (U.S. Pat. No. 6,062,566) provides a dominoes-style mathematical operation game.

Vildosola (U.S. Pat. No. 6,209,875) describes a domino playing piece system for helping children learn and recognize numbers and animals. The device includes a plurality of playing pieces with each playing piece comprising a display surface having first and second regions and a border between the first and second regions. The display surface of the playing piece has numeric indicia displayed thereon. Each of the first and second regions of the playing piece has an illustration displayed thereon with each illustration representing a numeric value. The sum of the numeric values of the illustrations of the first and second regions equals the value of the numeric indicia displayed on the playing piece.

Neiser (Design 142,491) offers a design for a set of dominoes while Underwood (Design 338,243) illustrates a design for a set of educational block tiles. Domino tiles show different geometrical shapes in the place of dots. And Nathanson (Design 662,149) provides a design for a set of domino tiles that include graphic displays of fruits.

BRIEF SUMMARY

In accordance with the present disclosure, a method of playing a learning game is provided that includes game pieces with a playing face divided into first and second sections, the first section displaying a first number and the second section displaying a first number, a mathematical operation, and a second number, the method including taking turns to place a game piece on a playing surface adjacent a game piece already on the playing surface in which a numeric value of the first number in the first section of the game piece or the numeric value of the result of the mathematical operation in the second section is equal to a numeric value of a first or second section of the game piece already on the playing surface that is not adjacent another game piece.

In accordance with another aspect of the present disclosure, a learning game system is provided that includes a plurality of game pieces, each game piece having first and second opposing sides with a playing face on the first side that is divided into a first section and a second section, the first section displaying a first number and the second section displaying the first number, a mathematical operation, and a second number, and each game piece that has the first number in the first section equal to the result of the mathematical operation in the second section is denominated as a "double" piece. The learning game system further includes rules of play that include the following steps:

shuffling the plurality of game pieces on a playing surface with the playing face facing the playing surface to form a draw pile of game pieces;

each player drawing a same number of game pieces from the draw pile of game pieces to form a hand of game pieces;

selecting a first player having a highest value double piece in their hand of game pieces to place the highest value double piece on the playing surface; and subsequent players taking a respective turn by either (i) placing a game piece from the respective subsequent player's hand of game pieces on to the playing surface adjacent a playing piece already on the playing surface in which a numeric value of the first number in the first section of the playing piece or the numeric value of the mathematical operation in the second section is equal to a numeric value of a first or second section of the playing piece already on the playing surface that is not adjacent another playing piece on the playing surface, or (ii) if no game piece in the subsequent player's hand can be played, the subsequent player drawing game pieces from the pile of game pieces until the subsequent player draws a game piece that can be played on the playing surface in accordance with step (i).

In accordance with another aspect of the present disclosure, a method of playing a learning game is disclosed, the game having a plurality of game pieces, each game piece having first and second opposing sides with a playing face on the first side divided into a first section and a second section, the first section displaying a first number and the second section displaying the first number, a mathematical operation, and a second number, and each game piece that has the first number in the first section equal to the result of the mathematical operation in the second section is denominated as a "double" piece, the method including:

shuffling the plurality of game pieces on a playing surface with the playing face facing the playing surface to form a draw pile of game pieces;

each player drawing a same number of pieces from the draw pile of game pieces to form a hand of game pieces;

determining a first player by determining which player has a highest numeric value double piece in their hand of game pieces;

playing a first game piece on the playing surface; and taking turns by subsequent players by either:

(i) placing a game piece from the respective subsequent player's hand of pieces on to the playing surface adjacent a game piece already on the playing surface in which a numeric value of the first number in the first section of the game piece or the numeric value of the mathematical operation in the second section is equal to a numeric value of a first or second section of the game piece already on the playing surface that is not adjacent another game piece on the playing surface, or (ii) if no game piece in the subsequent player's hand can be played, the subsequent player drawing game pieces from the pile of game pieces until the subsequent player draws a game piece that can be played on the playing surface in accordance with step (i).

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with game playing surfaces, score keeping, and shuffling of game pieces have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
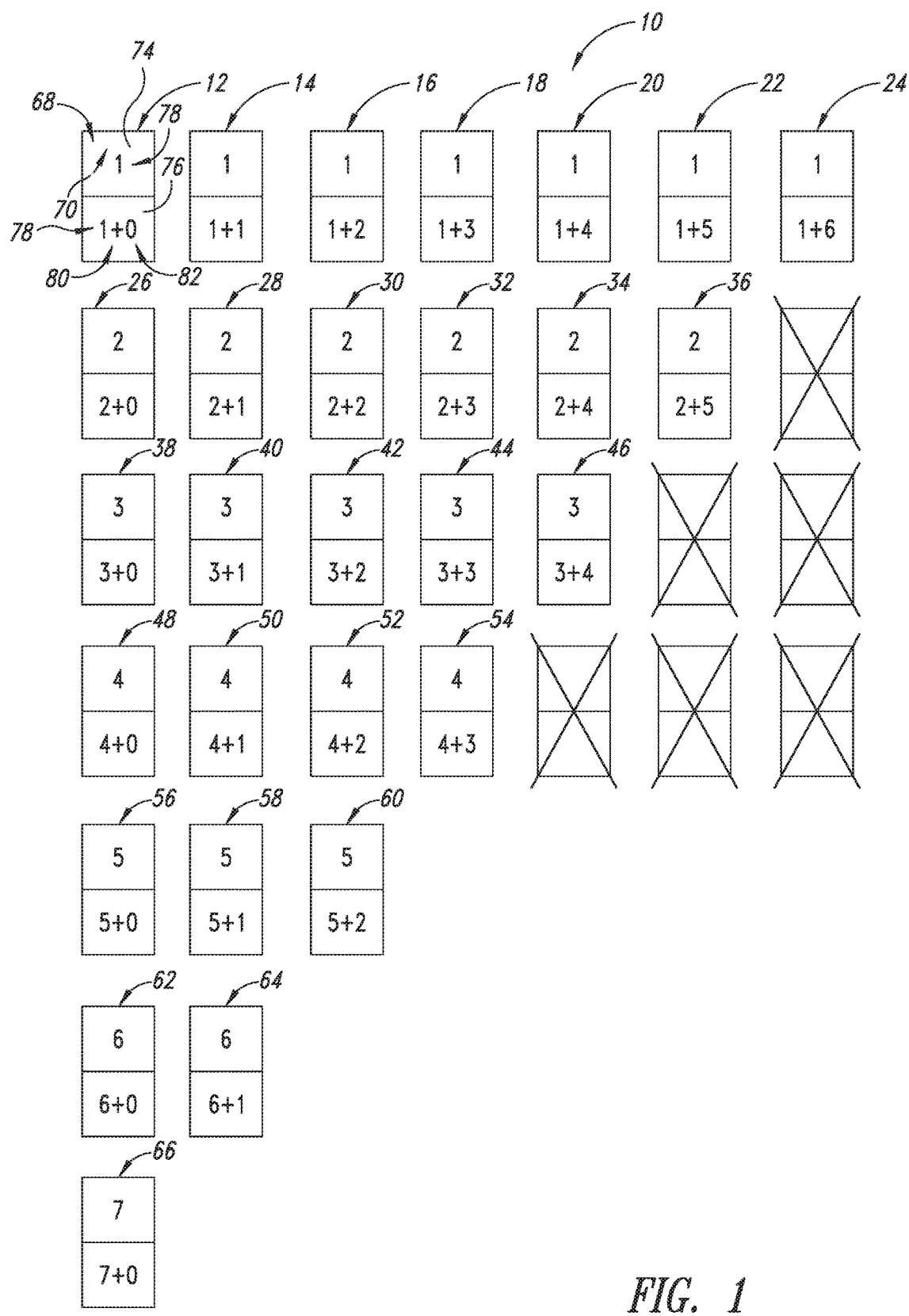
FIG. 1 is a plan view of the game pieces used to play the learning game in accordance with the present disclosure.

Referring initially to FIG. 1, shown therein is a plan view of game pieces 10 used in playing the learning game of the present disclosure. There are 28 unique game pieces 12, 14, 16, 18, 20, 22, 24, 26, 28, 30, 32, 34, 36, 38, 40, 42, 44, 46, 48, 50, 52, 54, 56, 58, 60, 62, 64, and 66. Each game piece 10 preferably has a rectangular shape with a first side 68 and an opposing second side 70. The first side 68 being a playing face 72 that is divided into a first section 74 and a second section 76.

As shown in FIG. 1, the first and second sections 74, 76 are of equal size and shape, in this case a perfect square. It is to be understood that the shape of the game pieces 10 may be other than a rectangle, including other geometric shapes, preferably a polygon in which straight sides may be placed adjacent each other to indicate which numbers are being matched. Other designs may be used that employ interlocking of pieces along matching sides. Hence, the method and design of this aspect of the game pieces is open to a variety of shapes.

The first section 74 displays a first number 78, preferably an Arabic numeral although other indicia may be used to communicate a numeric value, such as Roman numerals, dots, and the like. The second section 76 also displays the first number 78 along with a mathematical operation symbol 80 and a second number 82. The second number 82 can be of the same value as the first number 78 or any different value. As with the first number 78, the second number 82 can be displayed with any form of indicia that indicates a numeric value, although Arabic numerals are preferred. The mathematical operation symbol 80, such as addition (+), subtraction (−), multiplication (×), and division (÷), appears between the first and second numbers 78, 82 so as to indicate the mathematical operation that is to be performed with the two numbers.

It will be observed that in certain game pieces 12, 26, 38, 48, 56, 62, and 66, the first number 78 equals the sum of the addition of the first and second numbers 78, 82. Each game piece that has the first number 78 in the first section 74 equal to the result of the mathematical operation in the second section 76 is denominated as a "double" piece. In this case the first section 74 (or alternatively referred to as the first end 74) has the same numeric value as the second section 76 (also referred to as the second end 76).

It will be further noted that the lowest numeric value (in this case the numeral 1) appears in the first section 74 on only seven game pieces 10, in this case game pieces 12, 14, 16, 18, 20, 22, and 24. While the lowest numerical value numeral in this case was selected as the numeral "1," it is to be understood that any numeric value can be selected, such as zero (0), two (2), etc. The series of game pieces 12, 14, 16, 18, 20, 22, and 24 for the numerical value 1 in the first section 74 totals seven game pieces 10 in order to limit the total number of game pieces for the entire game to 28 game pieces.

In any case, the next highest numeric value numeral will appear in the first section 74 on a series of only six game pieces, as is the case with game pieces 26, 28, 30, 32, 34, and 36 having numeral "2" in the first section 74. Similarly, the third highest numerical value number appears in the first section 74 on a series of only five game pieces, in this case the numeral "3" appearing on five game pieces 38, 40, 42, 44, and 46. As can be seen, the fourth highest numerical value number is "4" and appears on a series of four game pieces 48, 50, 52, and 54, while the fifth highest numerical value number "5" appears on a series of three game pieces 56, 58, and 60, the sixth highest numerical value number "6" appears on a series of two game pieces 62, 64 and the seventh and last highest numerical value number "7" appears on one game piece 66.

In the second section 76 the first number 78 appears with the addition symbol 80 (+) followed by a second number 82. The second number 82 in a series of game pieces will always start out with the numerical value zero in order to create the "double" game piece, i.e., where the numerical value in the first section 74 equals the numerical value in the second section 76. Each subsequent game piece in the series of the numerical value for the first section 74 will have a numerical value that increases by the numerical value of 1.

Figure 2:
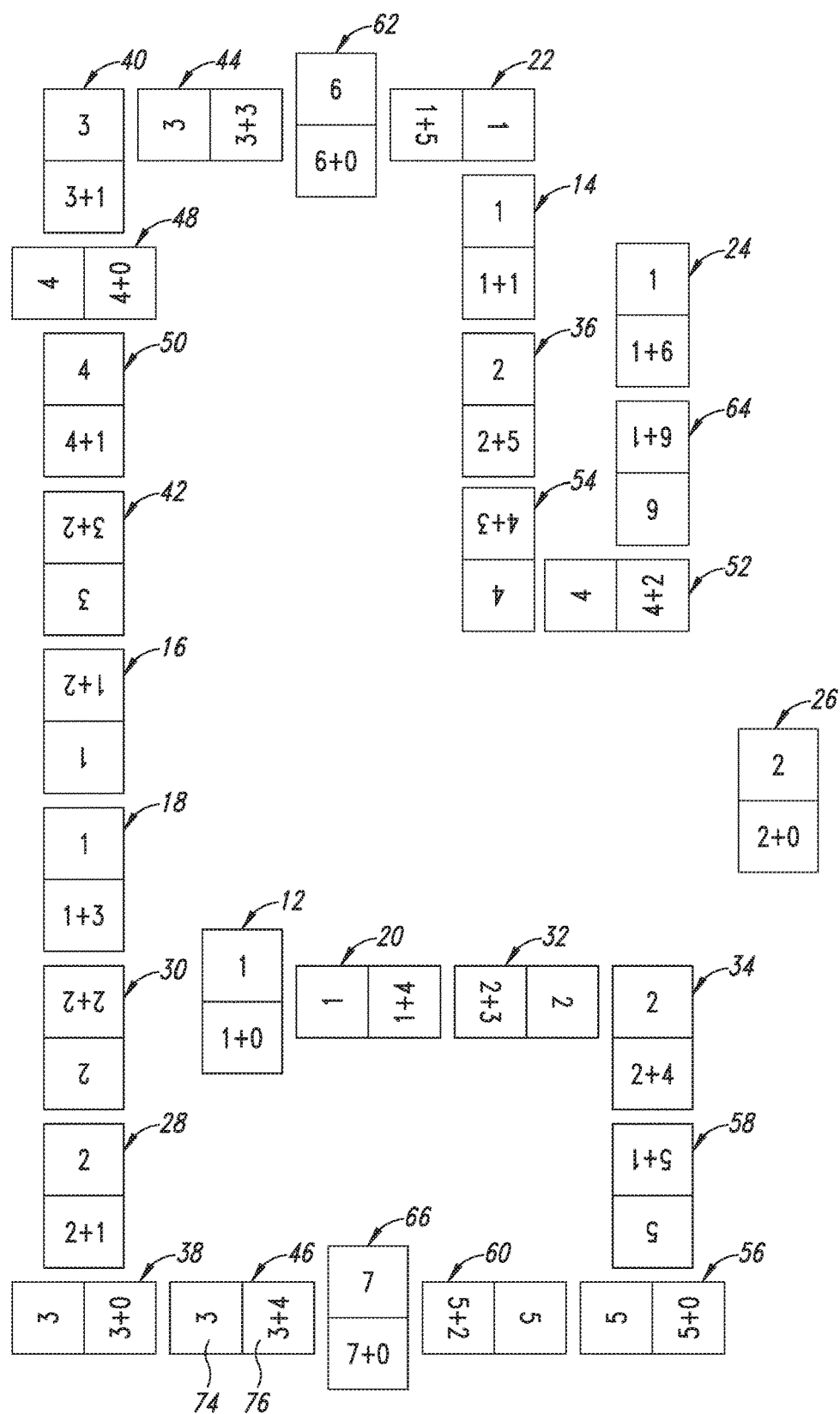
FIG. 2 is a plan view of the game pieces placed on a supporting surface in accordance with the method of game play of the present disclosure.

Having described the game pieces, reference is now made to FIG. 2 in connection with the method of game play. In accordance with the present disclosure, a method of playing a learning game is provided that includes the domino-style game pieces 10 and the rules of play as part of a game system 100 shown in FIG. 2. A supporting surface 102 (or alternatively referred to as a playing surface 102) can be provided with the game system 100 or an existing surface, such as a table top, can be used. And a container (not shown) can be provided to store the game pieces 10, along with the rules of play described herein, the optional supporting surface 10, and an optional score card and writing utensil, such as a pencil (also not shown).

In accordance with one aspect of the present disclosure, the rules of play include the following basic steps for playing with the afore-described 28 game pieces 10:

first, shuffling the plurality of game pieces 10 on a playing surface 102 with the playing face 72 facing the playing surface 102 to form a draw pile of game pieces 10;

second, each player drawing a same number of game pieces 10 from the draw pile of game pieces 10 to form a hand of game pieces;

next, selecting a first player having a highest value double piece in their hand of game pieces to place the highest value double piece on the playing surface; and subsequent players taking a respective turn by either (i) placing a game piece 10 from the respective subsequent player's hand of game pieces on to the playing surface adjacent a playing piece already on the playing surface in which a numeric value of the first number in the first section of the playing piece or the numeric value of the result of the mathematical operation in the second section is equal to a numeric value of a first or second section of the playing piece already on the playing surface that is not adjacent another playing piece on the playing surface, or (ii) if no game piece in the subsequent player's hand can be played according to (i), the subsequent player drawing game pieces from the pile of game pieces until the subsequent player draws a game piece that can be played on the playing surface in accordance with step (i).

Game play continues until all the pieces have been played or until no further pieces can be played. The player who plays the last piece in their hand or to block others from playing is the winner. The value of the piece left in the hands of the loosing team or player is added in favor of the winner.

FIG. 2 illustrates a representative completed game in which all of the pieces have been played with one leftover piece 26. In this game, the first piece played was the double 7 piece 66, which has the highest value in the game. After the first piece 66 was played, the second player played piece 46, which has the number 3 in the first section 74 and the sum of 7 in the second section, represented by the math operation of adding 3 and 4. The second section 76 is placed against the first piece 66 at the dividing line between the first and second sections, and it is oriented 90 degrees with respect to the first played piece 66 to form a "T" intersection. Similarly the second piece 60 played by a third player has a 5 in the first section and the math operation of 5 plus 2, which equals 7. This piece 60 is placed in an abutting relationship on the opposite side than the second piece 46 and in a similar "T" orientation.

Play continues from player to player with additional pieces being played so that the end of a first numeric value abuts the end of another piece with the same first numeric value. The numeric value can be either a numeral by itself in the first section 74 or the sum of the math operation, in this case addition, in the second section 76.

It is to be understood that there are many permutations of the game play other than that shown in FIG. 2. It is to be further understood that the mathematical operation could be subtraction, multiplication, addition, or others known to those of skill in the art.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of playing a learning game having a plurality of game pieces, each game piece having first and second opposing sides with a playing face on the first side divided into a first section and a second section, the first section displaying only a first number and the second section displaying in the following order: the first number, a mathematical operation, and a second number on which the mathematical operation is to be performed with the first number, and each game piece that has the first number in the first section equal to a result of the mathematical operation on the first and second numbers in the second section is denominated as a "double" piece, the method comprising:

shuffling the plurality of game pieces on a playing surface with the playing face facing the playing surface to form a draw pile of game pieces;

each player drawing a same number of game pieces from the draw pile of game pieces to form a hand of game pieces;

determining a first player by determining which player has a highest numeric value double game piece in their hand of game pieces;

playing a first game piece on the playing surface; and taking turns by subsequent players by:

placing a game piece from the respective subsequent player's hand of game pieces on to the playing surface adjacent a game piece already on the playing surface in which a numeric value of the result of the mathematical operation in the second section of the game piece from the respective subsequent player's hand of game pieces is equal to a numeric value of a first number or a mathematical operation of the first number and a second number on a respective first or second section of the game piece already on the playing surface and in which the respective first or second section is not adjacent another game piece on the playing surface; and (ii) in response to no game piece in the subsequent player's hand of game pieces being playable, the subsequent player drawing game pieces from the draw pile of game pieces until the subsequent player draws a game piece that can be played on the playing surface in accordance with step (i).

2. The method of claim 1 wherein playing a first game piece comprises playing the highest numeric value double game piece on the playing surface.

3. The method of claim 1, further comprising taking turns until either all game pieces have been played or no game pieces can be played.

* * * * *

UNITED STATES PATENT AND TRADEMARK OFFICE
CERTIFICATE OF CORRECTION

PATENT NO. : 10,217,373 B2  
APPLICATION NO. : 15/347671  
DATED : February 26, 2019  
INVENTOR(S) : Julian Ferreras Page 1 of 1

It is certified that error appears in the above-identified patent and that said Letters Patent is hereby corrected as shown below:

In the Claims

Column 8, Claim 1, Line 11:
"placing a game" should read --(i) placing a game--

Signed and Sealed this
Fifteenth Day of October, 2019

Andrei Iancu
*Director of the United States Patent and Trademark Office*